US011303083B2

(12) United States Patent
Wollert et al.

(10) Patent No.: US 11,303,083 B2
(45) Date of Patent: Apr. 12, 2022

(54) PLIERS WITH ANGLED CRIMPING OPENING

(71) Applicant: Snap-on Incorporated, Kenosha, WI (US)

(72) Inventors: Gary S. Wollert, Paris, WI (US); Anup A. Gupte, Buffalo Grove, IL (US); David T. Ross, Antioch, IL (US); Daniel M. Eggert, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 278 days.

(21) Appl. No.: 16/678,275

(22) Filed: Nov. 8, 2019

(65) Prior Publication Data

US 2021/0143601 A1 May 13, 2021

(51) Int. Cl.
*H01R 43/042* (2006.01)
*H02G 1/12* (2006.01)
*B25B 7/22* (2006.01)

(52) U.S. Cl.
CPC ........... *H01R 43/0421* (2013.01); *B25B 7/22* (2013.01); *H02G 1/1212* (2013.01)

(58) Field of Classification Search
CPC .... B25B 7/00; B25B 7/02; B25B 7/20; B25B 7/22; H01R 43/042; H01R 43/0421; H02G 1/1204; H02G 1/1207; H02G 1/1212; Y10T 29/53226; Y10T 29/539; B25F 1/003
See application file for complete search history.

(56) References Cited

U.S. PATENT DOCUMENTS

| 273,612 | A | 3/1883 | Schellenberger |
| 399,655 | A | 3/1889 | Daniels |
| 929,868 | A | 8/1909 | Mueller |
| 1,421,871 | A | 7/1922 | Wagner |
| 1,471,531 | A | 10/1923 | Schorrath |
| 1,621,745 | A | 3/1927 | Miller |
| 2,507,784 | A | 5/1950 | Hamel |
| 2,731,862 | A | 1/1956 | Schinske |

(Continued)

FOREIGN PATENT DOCUMENTS

| CN | 102651529 B | 12/2016 |
| CN | 205928329 U | 2/2017 |

(Continued)

OTHER PUBLICATIONS

United Kingdom Combined Search and Examination Report for corresponding UK Application No. GB2017504.8 dated Apr. 28, 2021, 8 pages.

(Continued)

Primary Examiner — Tyrone V Hall, Jr.
(74) Attorney, Agent, or Firm — Seyfarth Shaw LLP

(57) ABSTRACT

A crimping tool with a crimping opening extending at an angle to the axial direction of the tool. The tool can include jaws with multiple crimping openings cooperatively defined thereby at different angles relative to the longitudinal axial direction of the tool. For example, the crimping openings can begin at a respective faces of the jaw and such faces can extend at different angles relative to the longitudinal axial direction of the tool. In this manner, the tool can allow crimping of connectors at a variety of different angles, reduce jaw length and width, and improve the leverage of the crimpers.

21 Claims, 14 Drawing Sheets

(56) References Cited

U.S. PATENT DOCUMENTS

| | | |
|---|---|---|
| 3,831,207 A | 8/1974 | Boyajian |
| 3,854,202 A | 12/1974 | Cortese et al. |
| 4,009,514 A | 3/1977 | Couto |
| 4,028,756 A * | 6/1977 | Couto .................. H01R 43/042 |
| | | 7/107 |
| 4,226,145 A | 10/1980 | Gill |
| 4,331,183 A | 5/1982 | Calhoun |
| 4,403,497 A | 9/1983 | Matteucci |
| 4,607,544 A | 8/1986 | Jewell, Jr. |
| 4,637,084 A | 1/1987 | Wood |
| 4,870,876 A | 10/1989 | Rodriguez |
| 5,042,285 A | 8/1991 | Levy |
| 5,084,935 A | 2/1992 | Kalthoff |
| 5,193,336 A | 3/1993 | King |
| 5,228,325 A | 7/1993 | Wiebe et al. |
| 5,323,502 A | 6/1994 | Miller |
| 5,402,561 A | 4/1995 | Cerquone et al. |
| D419,050 S | 1/2000 | Lin |
| D419,418 S | 1/2000 | Lin |
| 6,748,617 B1 | 6/2004 | Toycen et al. |
| D507,467 S | 7/2005 | Eidson |
| 7,114,208 B1 | 10/2006 | Borst |
| 7,481,019 B2 | 1/2009 | Rosenberg |
| 8,015,853 B2 | 9/2011 | Steiner et al. |
| 8,074,536 B1 | 12/2011 | Allen |
| D657,219 S | 4/2012 | Kawell et al. |
| 8,495,902 B2 | 7/2013 | Wotton, III |
| 8,516,872 B2 | 8/2013 | Battenfeld et al. |
| 8,533,940 B2 | 9/2013 | Kawell et al. |
| D695,084 S | 12/2013 | Jensen |
| 8,650,688 B1 | 2/2014 | Gasparrini |
| 8,667,874 B2 | 3/2014 | Steele et al. |
| 8,739,594 B2 | 6/2014 | Anderson |
| 8,925,364 B2 | 1/2015 | Gupta |
| 9,108,313 B2 | 8/2015 | Gonzalez |
| 9,204,694 B2 | 12/2015 | Gasparrini |
| 9,415,485 B2 | 8/2016 | Steele et al. |
| D766,689 S | 9/2016 | Ritter |
| D801,771 S | 11/2017 | Wu |
| 2001/0004858 A1 | 6/2001 | Kachergius |
| 2005/0188468 A1 | 9/2005 | Crawford |
| 2007/0283740 A1 * | 12/2007 | Li .............................. B25B 7/04 |
| | | 72/409.16 |
| 2008/0098791 A1 | 5/2008 | Clark et al. |
| 2012/0131983 A1 | 5/2012 | Wotton, III |
| 2015/0188272 A1 | 7/2015 | Esterkin |
| 2016/0294168 A1 | 10/2016 | Hoppe |

FOREIGN PATENT DOCUMENTS

| | | |
|---|---|---|
| EP | 2493035 A2 | 8/2012 |
| GB | 748673 A | 5/1956 |
| TW | 467439 | 12/2001 |
| TW | M521521 | 5/2016 |
| WO | 91/16176 A1 | 10/1991 |

OTHER PUBLICATIONS

Examination Report No. 1 for corresponding Australian Application No. 2020264277 dated Jul. 27, 2021, 5 pages.

Taiwan Office Action for corresponding Application No. 11020720940 dated Jul. 29, 2021, 16 pages.

* cited by examiner

PLIERS WITH ANGLED CRIMPING OPENING

TECHNICAL FIELD OF THE INVENTION

The present invention relates generally to pliers. More particularly, the present invention relates to crimping pliers having an angled crimping location.

BACKGROUND OF THE INVENTION

Crimping tools are a common hand tool used in electrical applications. Crimping tools crimp a connector to a terminal end of a wire, typically by crimping or plastically deforming the connector to compress an electrically conductive material inside of the connector (e.g., a metal) against a bare, terminal portion of the wire being connected, thus electrically bonding the wire to the connector. The tools include handles that are pivotally coupled and can be brought together, thereby causing jaws to close on the connector to crimp the connector, such as common with pliers.

A conventional crimping tool is shown in FIG. 14. As shown, a tool 1400 includes a first handle 1405 and a second handle 1410 that are pivotally connected and that a user can grip to apply a crimping force to a connector C. The crimping tool 1400 can include a crimper 1415 with a first crimping surface 1420 and a second crimping surface 1425. The connector C can be inserted within these two surfaces 1420, 1425 and, based on the force of the handles 1405, 1410, can crimp by plastically deforming the connector C to couple the connector C to a wire terminal end.

As shown, the crimping tool 1400 typically includes crimping surfaces 1420, 1425 that are disposed on the side of the jaws and extend perpendicular to the axis along which the tool 1400 extends. In this manner, the tool 1400 must be inserted into an area with sufficient clearance for the handles 1405, 1410 surrounding the connector C, and can therefore be difficult to use in hard to reach areas.

SUMMARY OF THE INVENTION

The present invention broadly comprises a wire-crimping tool having a crimping opening located within the jaws of the tool and extending at an angle to the axial direction of the jaws. The tool can include multiple crimping openings, with one of the openings being substantially in line with the longitudinal axis of the tool; and another of the crimping openings extending at an angle to the longitudinal axis of the tool. For example, the angled opening can extend normal to a face of the tool that extends at an angle relative to the longitudinal axis of the tool. In this manner, the tool allows for crimping of wire connectors at a variety of different angles, reduced jaw size, and improved leverage on the crimpers due to their proximity to the connection point of the first and second handles of the tool.

In particular, the present invention broadly comprises a tool having a longitudinal axis and includes a first handle extending to a first jaw and a second handle extending to a second jaw. The first and second jaws cooperatively define first and second faces. The tool further includes a connection point pivotably coupling the first and second jaws, with a first crimper cooperatively defined by the first and second jaws and extending from the first face at an angle relative to the longitudinal axis, and a second crimper cooperatively defined by the first and second jaws and extending from the second face at an angle relative to the longitudinal axis.

The present invention also broadly comprises a tool having a longitudinal axis and includes a first handle extending to a first jaw and a second handle extending to a second jaw. The first and second jaws cooperatively define first and second faces. The first face extends at an angle relative to the longitudinal axis, and the second face extends perpendicular relative to the longitudinal axis. The tool further includes a connection point pivotably coupling the first and second jaws, a first crimper cooperatively defined by the first and second jaws and extending from the first face at an angle relative to the longitudinal axis, and a second crimper cooperatively defined by the first and second jaws and extending from the second face at an angle relative to the longitudinal axis.

The present invention further broadly comprises a tool having a longitudinal axis and includes a first handle extending to a first jaw and a second handle extending to a second jaw. The first and second jaws cooperatively define first and second faces. The first face extends at an angle relative to the longitudinal axis, and the second face extends from the first face at an angle relative to the first face. The tool can further include a connection point pivotably coupling the first and second jaws, a first crimper cooperatively defined by the first and second jaws and extending from the first face at an angle relative to the longitudinal axis, and a second crimper cooperatively defined by the first and second jaws and extending from the second face at an angle relative to the longitudinal axis.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
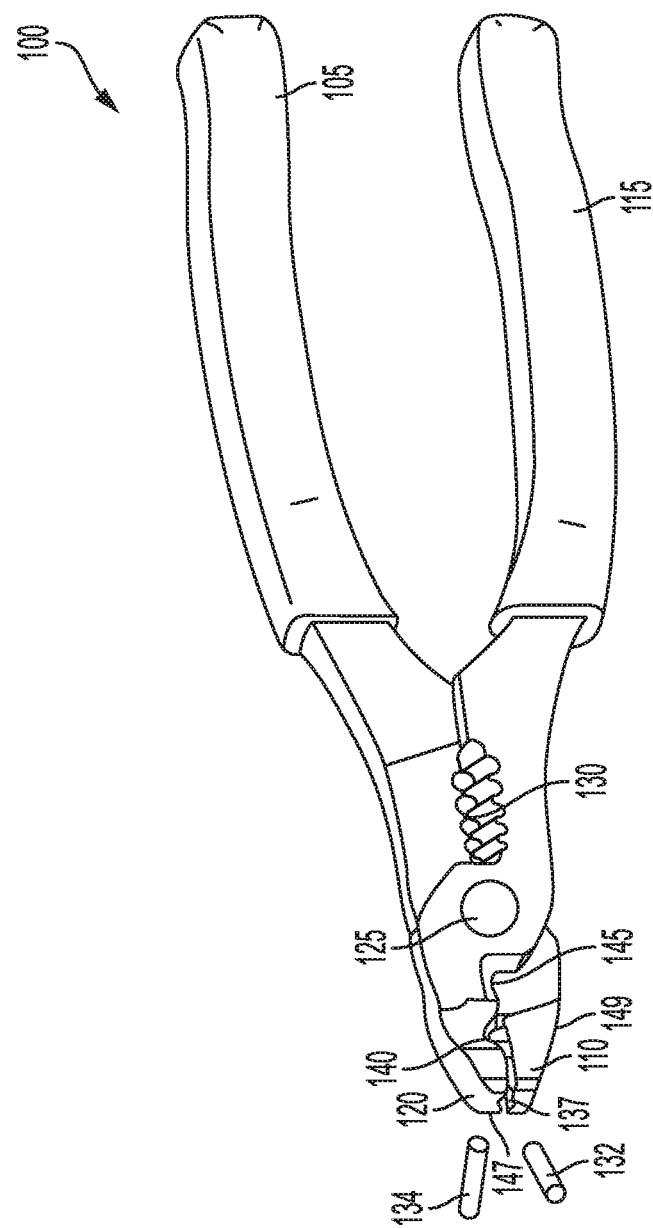
FIG. 1 is a side perspective view of a tool according to an embodiment of the present invention.
Figure 2:
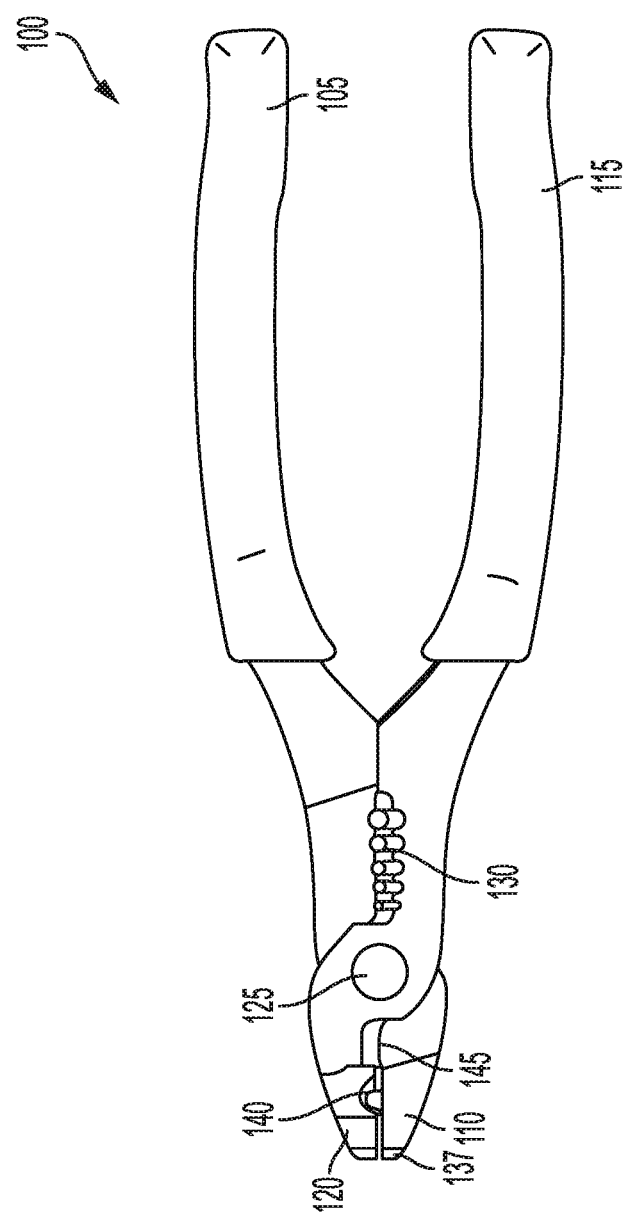
FIG. 2 is a side plan view of a tool according to an embodiment of the present invention.
Figure 3:
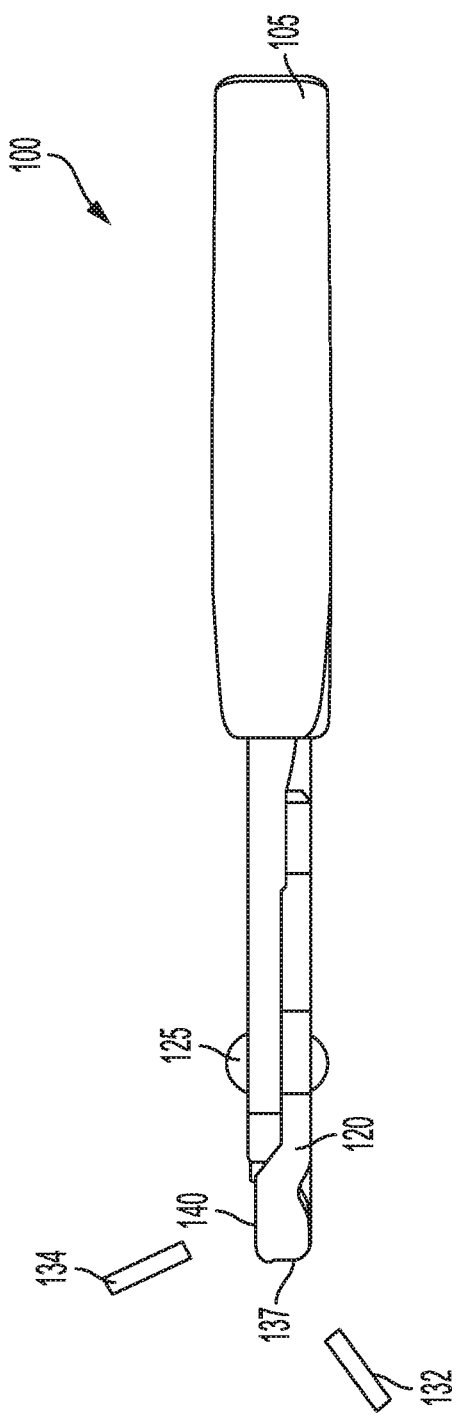
FIG. 3 is a top plan view of a tool according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a crimping tool with a crimping opening cooperatively defined by jaws at an angle relative to the longitudinal axial direction of the jaws. The jaws can define multiple crimping openings disposed at different angles relative to the longitudinal axial direction, including one of the crimping openings extending substantially in line with the longitudinal axial direction. For example, and without limitation, the jaws can include outwardly facing jaw faces where the crimping openings begin, and such faces can extend at different angles relative to the longitudinal axial direction of the tool. In this manner, the tool can allow for crimping of wire connectors at a variety of different angles.

Referring to FIGS. 1-5, a tool 100 includes first 105 and second 115 handles respectively leading to first 110 and second 120 jaws. A connection point 125, such as a screw or rivet, can pivotally couple the first handle 105 and first jaw 110 to the second handle 115 and second jaw 120, thereby allowing pivoting about the connection point 125. One or more wire strippers 130 can be located adjacent the connection point 125 and can be made up of stripper openings for respectively differently sized wires defined within the first 105 and second 115 handles, as known in the art. For example, the wire strippers 130 can be located on a side of the connection point 125 proximal to the first and second handles 105, 115.

Various wire connectors can be crimped by the tool 100 using crimping openings disposed at different angles with respect to the jaws 110, 120 of the tool. For example, and without limitation, first 132 and second 134 connectors can be respectively crimped by first 137 and second 140 crimpers of the tool 100. As shown, the first connector 132 can be an insulated connector and the first crimper 137 can be a crimper adapted to crimp an insulated connector, but the first connector 132 and crimper 137 are not so limited. For example, the first crimper 137 can be structured to crimp a bare connector 134; or both crimpers 137, 140 can be structured to crimp the same type of connector (insulated or bare). A cutter 145 can also be provided to cut insulated or bare connectors or wire, for example, and can be cooperatively formed within the jaws 110, 120 of the tool 100 adjacent the connection point 125 opposite the stripper 130.

As shown, the crimpers 137, 140 can extend at an angle relative to the longitudinal axial direction or axis of the tool 100. For example, the first crimper 137 can begin at a first face 147 of the tool 100 that is substantially perpendicular to the longitudinal axial direction of the tool 100, but can extend at a first crimper angle relative to the first face 147. The first crimper angle may be any angle. In an example, the first crimper angle may be about 5 to about 85 degrees, or about −5 to about −85 degrees; and more particularly about 30 to about 60 degrees, or about −30 to about −60 degrees. The second crimper 140 can begin at a second face 149 of the tool 100 perpendicular to the longitudinal axial direction and extend at a second crimper angle thereto. The second crimper angle may be any angle. In an example, the second crimper angle may be about 5 to about 85 degrees, or about −5 to about −85 degrees; and more particularly about 30 to about 60 degrees, or about −30 to about −60 degrees. As described herein, the term "extend at an angle" to the longitudinal axial direction means to extend at an angle that is neither perpendicular nor parallel to the longitudinal axial direction of the tool 100. To "extend in a direction perpendicular to" and "extend in a direction parallel to" the longitudinal axial direction means to respectively extend in a direction substantially perpendicular or parallel to the longitudinal axial direction of the tool, within reasonable tolerances known to those skilled in the art. As shown in the embodiment of FIGS. 1-6, the first face 147 can be perpendicular to the second face 149.

Figure 4:
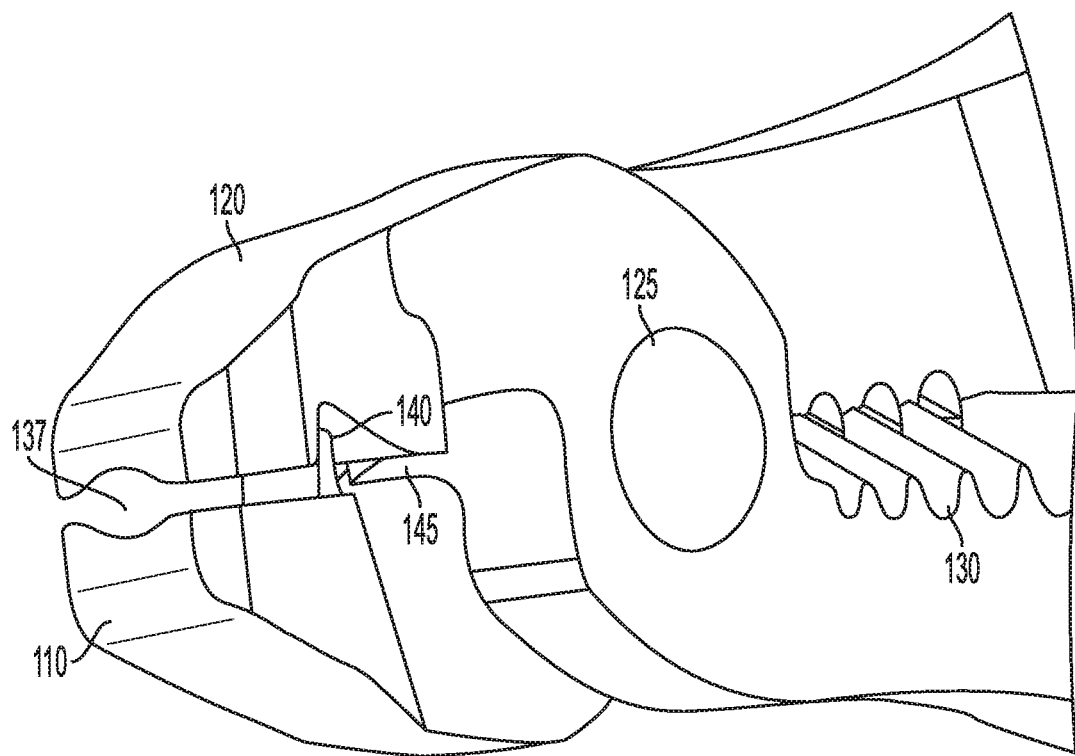
FIG. 4 is an enlarged partial perspective view of a tool from a view normal to a first crimper according to an embodiment of the present invention.
Figure 5:
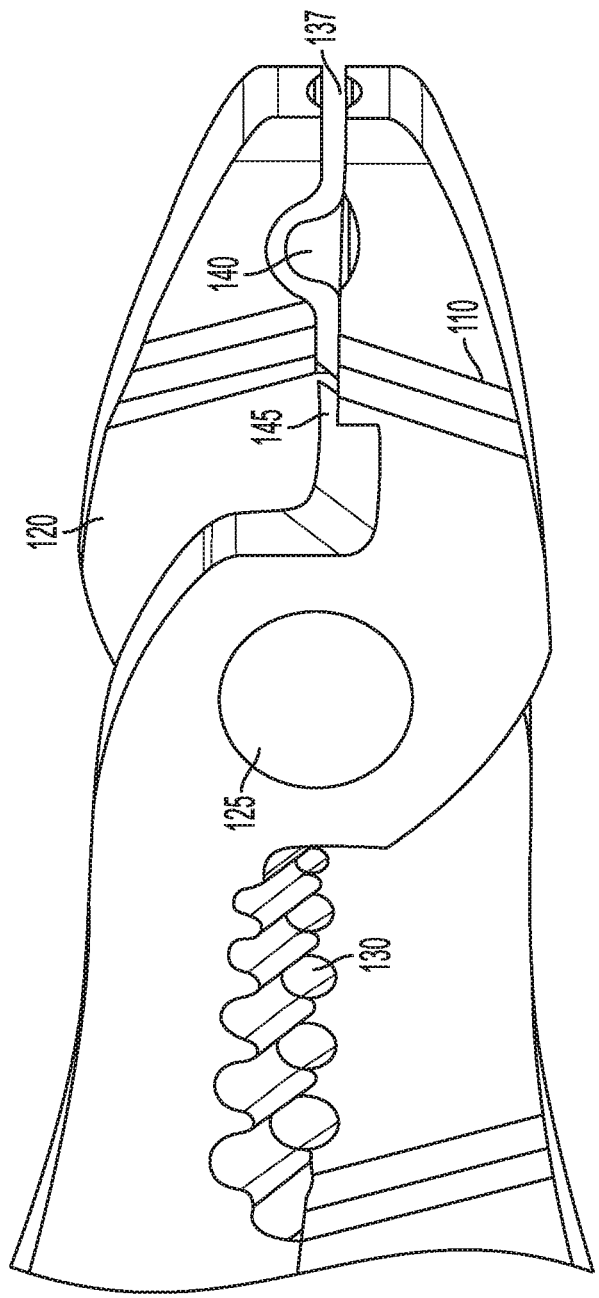
FIG. 5 is an enlarged partial perspective view of a tool from a view normal to a second crimper according to an embodiment of the present invention.
Figure 6:
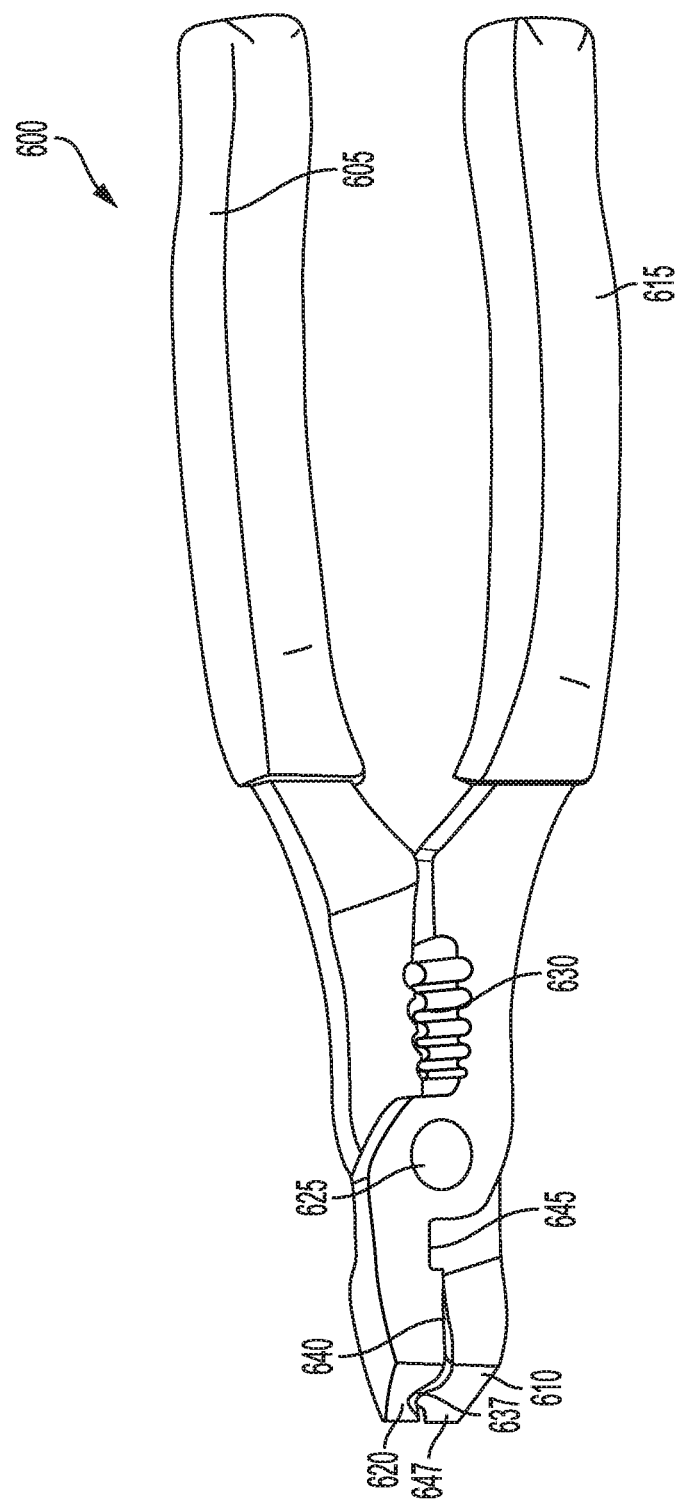
FIG. 6 is a side perspective view of a tool according to another embodiment of the present invention.
Figure 7:
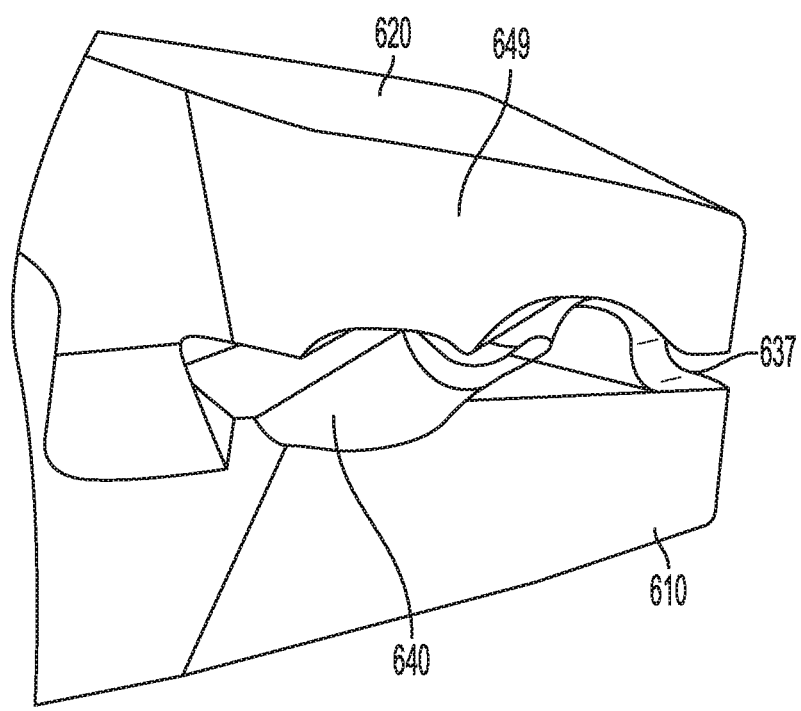
FIG. 7 is an enlarged partial perspective view of a tool according to an embodiment of the present invention.
Figure 8:
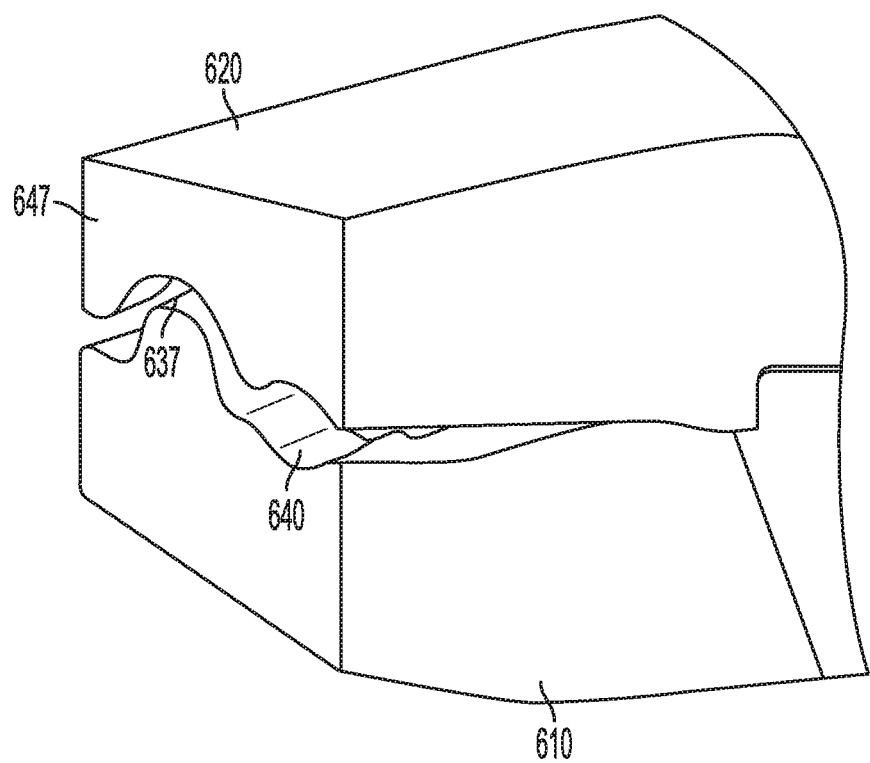
FIG. 8 is an enlarged partial perspective view of a tool according to an embodiment of the present invention.

FIG. 4 is an enlarged partial perspective view of the tool 100 from a view normal to the first crimper 137; and FIG. 5 is an enlarged partial perspective view of the tool 100 from a view normal to the second crimper 140 according to at least some of the presently disclosed embodiments. As shown, the first crimper 137 extends at a first crimper angle relative to the longitudinal axial direction of the tool 100 to allow compact crimping of connectors and to further permit the second crimper 140 to be defined in the jaws 110, 120 of the tool 100 in a compact manner. The length of the jaws 110, 120 can also be reduced by combining the crimpers 137, 140 in this manner and the leverage applied by the tool 100 can be maximized by locating the crimpers 137, 140 closer to the connection point 125.

FIGS. 6-9 illustrate another embodiment of the present invention with like elements defined by like numerals. For example, the embodiment of FIGS. 6-9 includes a tool 600 with first 605 and second 615 handles respectively leading to first 610 and second 620 jaws. A connection point 625, such as a screw or rivet, can pivotally couple the first handle 605 and first jaw 610 to the second handle 615 and second jaw 620 and allow pivoting thereof. A wire stripper 630 can be located near the connection point 625 and can include stripper openings that allow the stripping of wire coverings of wires having different thicknesses or gauges, as is known in the art. The tool 600 can further include multiple crimpers such as a first 637 and second 640 crimper for respectively crimping the first 132 and second 134 connectors; and a cutter 645 for cutting the connectors 132, 134, or any other object that may need to be cut.

Figure 9:
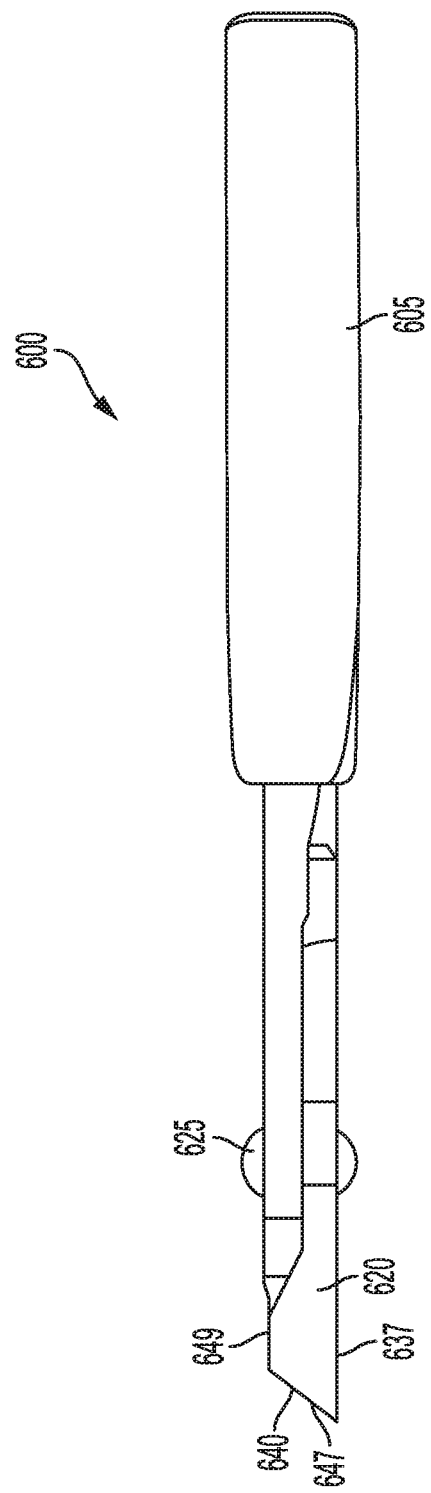
FIG. 9 is a top plan view of a tool according to an embodiment of the present invention.

The embodiment of FIGS. 6-9 includes a first face 647 at the front of the tool 100 that extends at a first face angle to the longitudinal axial direction of the tool 100, and a second face 649 that extends parallel to the longitudinal axial direction of the tool 100, as best shown in FIG. 9. The first crimper 637 can extend through the jaws 610, 620 in a direction normal to the first face 647 and at a first crimper angle to the longitudinal axial direction of the tool 100; and the second crimper 640 can extend through the jaws 610, 620 in a direction normal to the second face 649 and perpendicular to the longitudinal axial direction of the tool 100. In this manner, the first 637 and second 640 crimpers can extend at an angle relative to one another and allow a shorter jaw length, with higher leverage applied by the jaws 610, 620 due to the closeness of the crimpers 637, 640 to the connection point 625. Similar to the first crimper angle described above, the first crimper angle of the first crimper 637 can be any angle. In an example, the first crimper angle may be about 5 to about 85 degrees, or about −5 to about −85 degrees; and more particularly about 30 to about 60 degrees, or about −30 to about −60 degrees.

Figure 10:
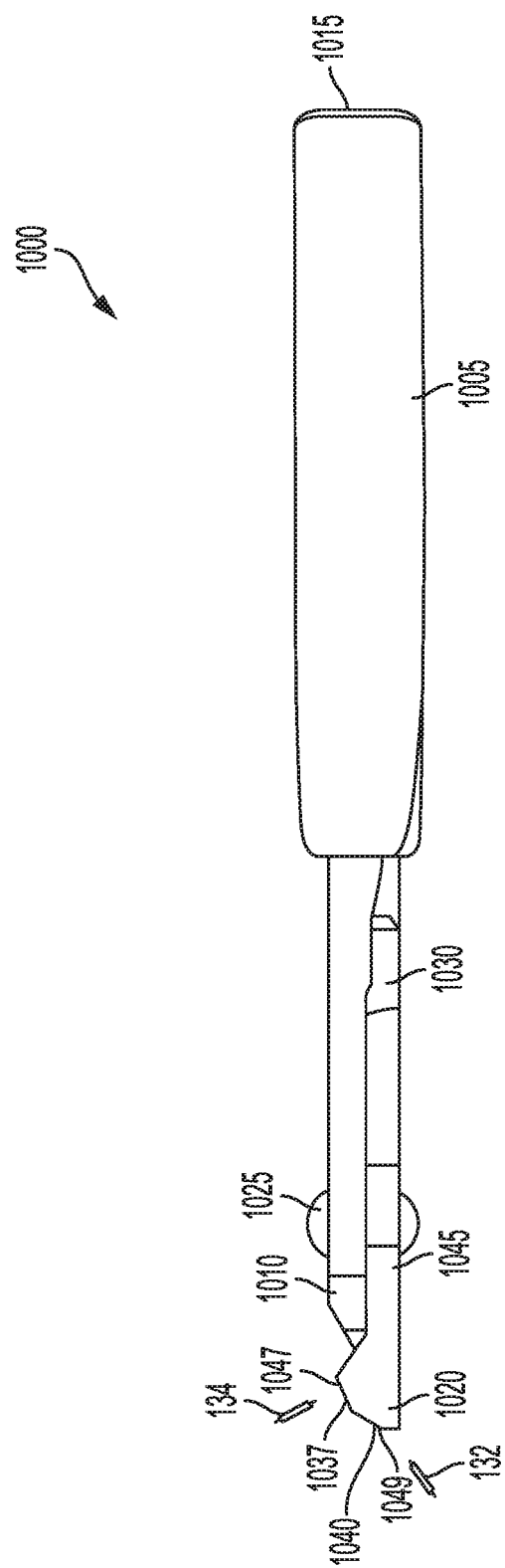
FIG. 10 is a top plan view of yet another embodiment of a tool according to at least some of the presently disclosed embodiments.

FIG. 10 illustrates yet another embodiment of the present invention with like elements defined by like numerals. For example, the embodiment of FIG. 10 includes a tool 1000 with first 1005 and second 1015 handles respectively leading to first 1010 and second 1020 jaws. A connection point 1025, such as a screw or rivet, can pivotally couple the first handle 1005 and first jaw 1010 to the second handle 1015 and second jaw 1020 and allow pivoting thereof. A stripper 1030 can be located near the connection point 1025 and can include stripper openings that allow the stripping of wire coverings, as is known in the art. The tool 1000 can further include multiple crimpers such as a first 1037 and second 1040 crimpers for crimping the first 132 and second 134 connectors; and a cutter 1045 for cutting the connectors 132, 134, or any other object that may need to be cut.

Similar to the embodiment shown in FIGS. 6-9, the tool 1000 of FIG. 10 can include a first face 1047 that extends at an angle to a second face 1049 of the jaws 1010, 1020. The first 1037 and second 1040 crimpers can then extend through the jaws 1010, 1020, respectively beginning at the first 1047 and second 1049 faces and extending perpendicular thereto Similar spatial and leverage advantages are provided by the embodiment of FIG. 10 as those discussed above with respect to the embodiments shown in FIGS. 1-9.

Figure 11:
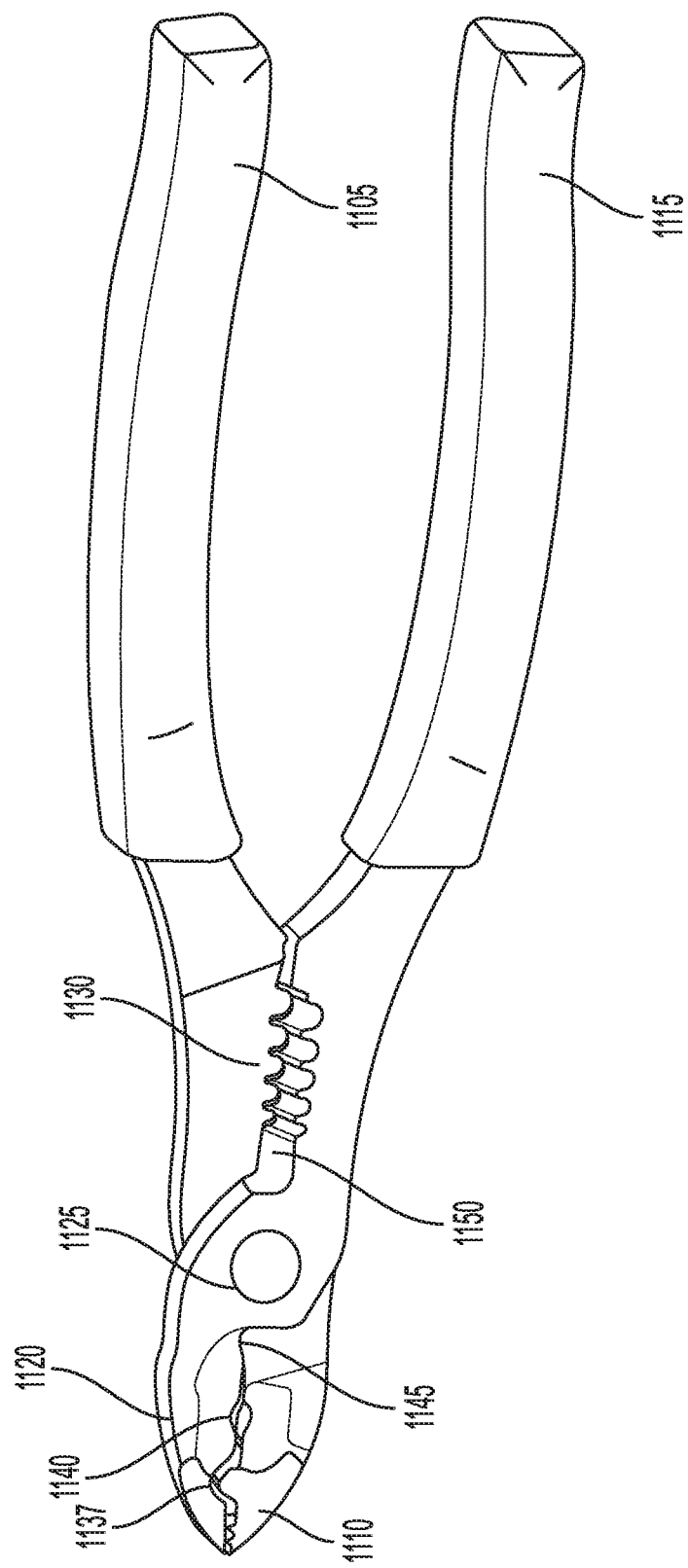
FIG. 11 is a side perspective view of a tool according to an embodiment of the present invention.
Figure 12:
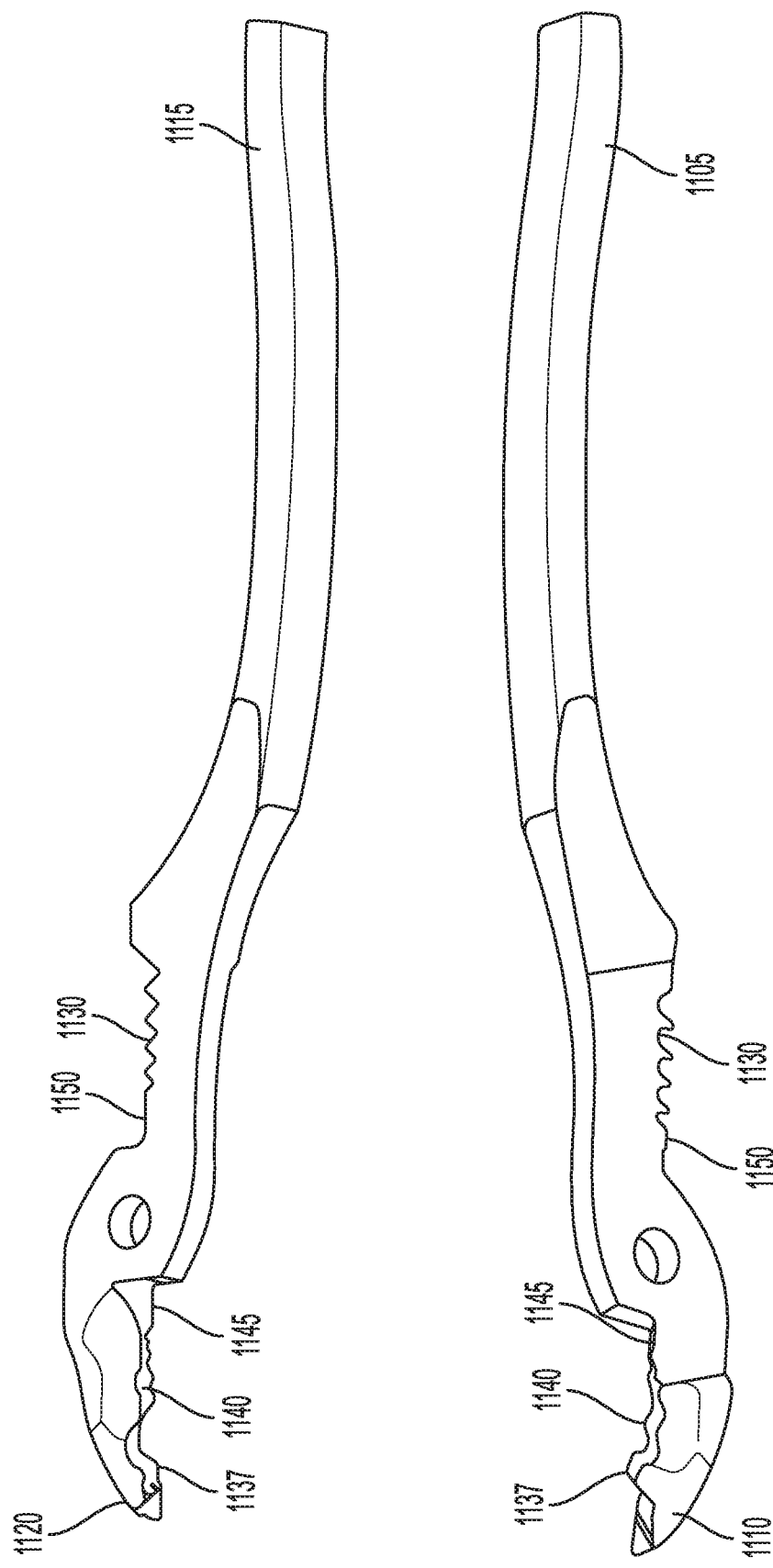
FIG. 12 is a disassembled view of a tool according to an embodiment of the present invention.
Figure 13:
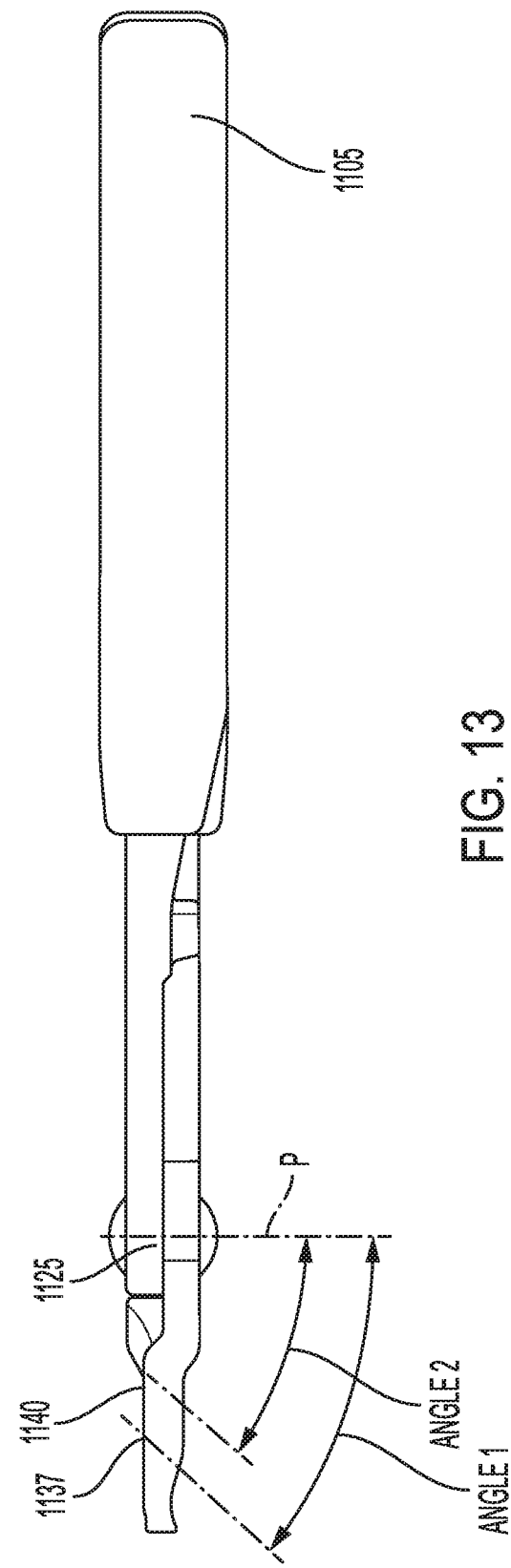
FIG. 13 is a top plan view of a tool according to an embodiment of the present invention.
Figure 14:
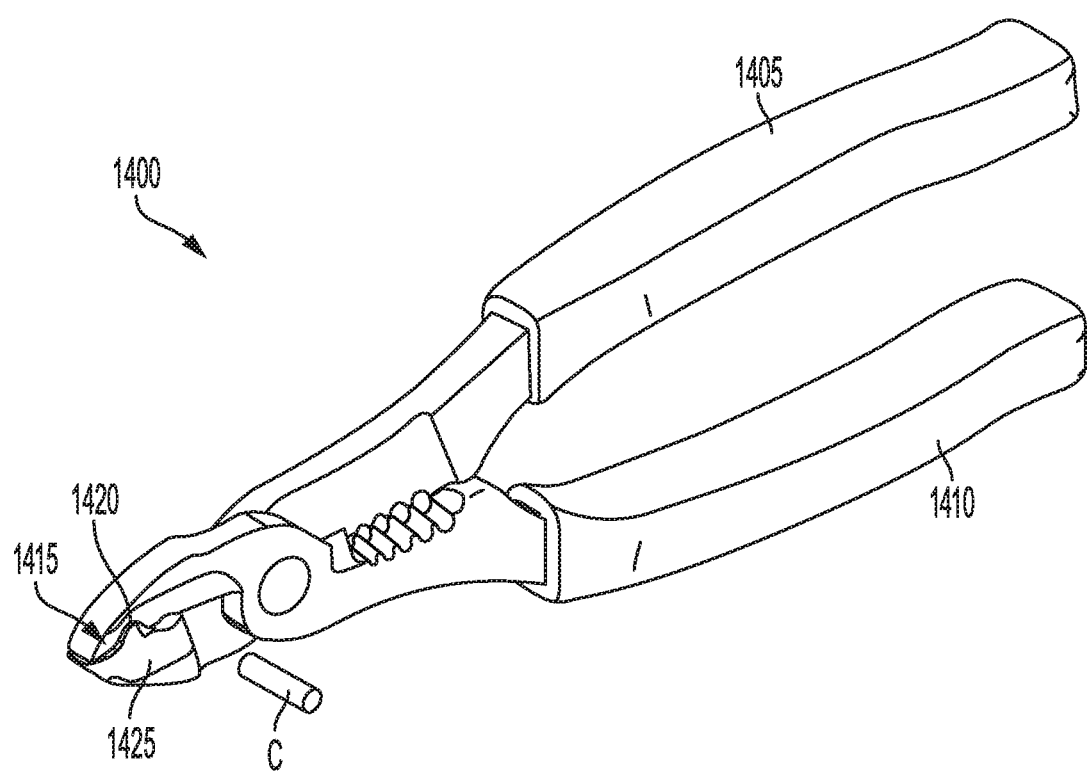
FIG. 14 is a front perspective view of a prior art tool.

FIGS. 11-13 illustrate another embodiment of the present invention with like elements defined by like numerals. For example, the embodiment of FIGS. 11-14 includes a tool 1100 with first 1105 and second 1115 handles respectively leading to first 1110 and second 1120 jaws. A connection point 1125, such as a screw or rivet, can pivotally couple the first handle 1105 and first jaw 1110 to the second handle 1115 and second jaw 1120 and allow pivoting thereof. A stripper 1130 can be located near the connection point 1125 and can include stripper openings that allow the stripping of wire coverings, as is known in the art. The tool 1100 can further include multiple crimpers such as a first 1137 and second 1140 crimper for crimping connectors. Additionally, the tool can include a front cutter 1145 for cutting the connectors 132, 134, or any other object that may need to be cut, and a back cutter 1150 for cutting connectors or any other object that may need to be cut, such as a wire after the wire covering has been removed using the stripper 1130. For example, the front cutter 1145 may be disposed on a side of the connection point 1125 proximal to the first and second jaws 1110, 1120; and the back cutter 1150 may be disposed on a side of the connection point 1125 proximal to the first and second handles 1105, 1115. Accordingly, the front cutter 1145 and back cutter 1150 may be located on opposite sides of the connection point 1125.

The embodiment shown in FIGS. 11-13 includes first 1137 and second 1140 crimpers that may each be a different angle relative to a pivot axis P of the tool 100. For example, an angle 1 (first crimper angle) defined between the first crimper 1137 and the pivot axis P may be greater than an angle 2 (second crimper angle) defined between the second crimper 1140 and the pivot axis P. In this manner, the tool 100 can be used for different crimping applications. For example, the first crimper 1137 may be used for crimping a bare connector, and the second crimper 1140 may be used for crimping an insulated connector, or vice versa. In an example, the angle 1 is about 1 to 89 degrees or about −1 or −89 degrees, and more particularly about 30 to 60 degrees or about −30 to −60 degrees; and the angle 2 is about 1 to 89 degrees or about −1 or −89 degrees, and more particularly about 30 to 60 degrees or about −30 to −60 degrees. Further, as illustrated, the angles 1 and 2 may be different or substantially the same. Similar spatial and leverage advantages are provided by the embodiment of FIGS. 11-13 as those discussed above with respect to FIGS. 1-10.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having a longitudinal axis, comprising:
   a first handle extending to a first jaw;
   a second handle extending to a second jaw, wherein the first and second jaws cooperatively define first and second faces, and the first and second handles and first and second jaws extend in a direction of the longitudinal axis;
   a connection point pivotably coupling the first and second jaws with respect to a pivot axis that is substantially perpendicular to the longitudinal axis;
   a first crimper cooperatively defined by the first and second jaws and extending from the first face at a first crimper angle that is non-parallel and non-perpendicular relative to the longitudinal axis and the pivot axis; and
   a second crimper cooperatively defined by the first and second jaws and extending from the second face at a second crimper angle that is non-parallel and non-perpendicular relative to the longitudinal axis and the pivot axis.

2. The tool of claim 1, wherein the first face is disposed substantially perpendicular to the second face.

3. The tool of claim 1, wherein the first face is disposed at a first face angle that is non-parallel and non-perpendicular relative to the second face.

4. The tool of claim 3, wherein the second face is disposed substantially parallel to the longitudinal axis.

5. The tool of claim 1, further comprising a stripper located proximal to the connection point, wherein the stripper includes stripper openings cooperatively defined by the first and second handles.

6. The tool of claim 1, further comprising a first cutter located proximal to the connection point, the first cutter cooperatively formed within the jaws proximal to the connection point.

7. The tool of claim 6, further comprising a stripper located proximal to the connection point, wherein the stripper includes stripper openings cooperatively defined by the first and second handles, and wherein the first cutter and the stripper are respectively located on opposite sides of the connection point.

8. The tool of claim 6, further comprising a second cutter, wherein the first and second cutters are respectively located on opposite sides of the connection point.

9. The tool of claim 1, wherein the first face is disposed substantially perpendicular to the longitudinal axis.

10. The tool of claim 9, wherein the second face is disposed substantially parallel to the longitudinal axis.

11. A tool having a longitudinal axis, comprising:
a first handle extending to a first jaw;
a second handle extending to a second jaw, wherein the first and second jaws cooperatively define first and second faces, the first and second handles and first and second jaws extend in a direction of the longitudinal axis, and the first face is disposed at a first face angle relative to the longitudinal axis and the second face is disposed substantially parallel relative to the longitudinal axis;
a connection point pivotably coupling the first and second jaws with respect to a pivot axis that is substantially perpendicular to the longitudinal axis;
a first crimper cooperatively defined by the first and second jaws and extending from the first face at a first crimper angle that is substantially perpendicular relative to the first face, wherein the first face angle of the first face is non-parallel and non-perpendicular relative to the longitudinal axis and the pivot axis; and
a second crimper cooperatively defined by the first and second jaws and extending from the second face at a second crimper angle that is substantially perpendicular relative to the longitudinal axis.

12. The tool of claim 11, wherein the first face is disposed at a second face angle relative to the second face.

13. The tool of claim 11, further comprising a stripper located adjacent to the connection point, wherein the stripper includes stripper openings cooperatively defined by the first and second handles.

14. The tool of claim 11, further comprising a first cutter located adjacent to the connection point, the first cutter cooperatively formed within the jaws of the tool adjacent to the connection point.

15. The tool of claim 14, further comprising a stripper located adjacent to the connection point, wherein the stripper includes stripper openings cooperatively defined by the first and second handles, and wherein the first cutter and the stripper are respectively located on opposite sides of the connection point.

16. The tool of claim 14, further comprising a second cutter located adjacent to the connection point, wherein the first and second cutters are respectively located on opposite sides of the connection point.

17. A tool having a longitudinal axis, comprising:
a first handle extending to a first jaw;
a second handle extending to a second jaw, wherein the first and second jaws cooperatively define first and second faces, the first and second handles and first and second jaws extend in a direction of the longitudinal axis, and the first face is disposed at a first face angle relative to the longitudinal axis and the second face extends from the first face at a second face angle relative to the first face, wherein each of the first and second face angles is non-parallel and non-perpendicular relative to the longitudinal axis;
a connection point pivotably coupling the first and second jaws with respect to a pivot axis that is substantially perpendicular to the longitudinal axis;
a first crimper cooperatively defined by the first and second jaws and extending from the first face at a first crimper angle that is substantially perpendicular relative to the first face; and
a second crimper cooperatively defined by the first and second jaws and extending from the second face at a second crimper angle that is substantially perpendicular relative to the second face.

18. The tool of claim 17, further comprising a stripper located adjacent to the connection point, wherein the stripper includes openings cooperatively defined by the first and second handles.

19. The tool of claim 17, further comprising a first cutter located adjacent to the connection point, the first cutter cooperatively formed within the jaws of the tool adjacent to the connection point.

20. The tool of claim 19, further comprising a stripper located adjacent to the connection point, wherein the stripper includes openings cooperatively defined by the first and second handles, and wherein the first cutter and the stripper are respectively located on opposite sides of the connection point.

21. The tool of claim 19, further comprising a second cutter located adjacent to the connection point, wherein the first and second cutters are respectively located on opposite sides of the connection point.

* * * * *